United States Patent
Tsuji et al.

(10) Patent No.: US 7,860,945 B2
(45) Date of Patent: Dec. 28, 2010

(54) INFORMATION AND PROGRAMMING BROWSE SHARING METHOD

(75) Inventors: Tsuneyuki Tsuji, Kawasaki (JP);
Shigeki Muramoto, Kawasaki (JP);
Misako Kawabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1039 days.

(21) Appl. No.: 09/964,637

(22) Filed: Sep. 28, 2001

(65) Prior Publication Data
US 2002/0194311 A1 Dec. 19, 2002

(30) Foreign Application Priority Data
May 29, 2001 (JP) ............................. 2001-160019

(51) Int. Cl.
*G06F 15/16* (2006.01)
(52) U.S. Cl. ...................................... 709/218; 709/229
(58) Field of Classification Search ................ 709/206, 709/228; 725/46, 47
See application file for complete search history.

(56) References Cited

U.S. PATENT DOCUMENTS

| | | | |
|---|---|---|---|
| 6,481,010 B2 * | 11/2002 | Nishikawa et al. ............. 725/44 |
| 6,745,367 B1 * | 6/2004 | Bates et al. .................. 715/500 |
| 6,754,904 B1 * | 6/2004 | Cooper et al. ................. 725/32 |
| 6,774,926 B1 * | 8/2004 | Ellis et al. ................. 348/14.01 |
| 6,851,090 B1 * | 2/2005 | Gutta et al. .................. 715/716 |
| 6,859,937 B1 * | 2/2005 | Narayan et al. ............... 725/37 |
| 6,898,762 B2 * | 5/2005 | Ellis et al. ..................... 725/46 |
| 2002/0049806 A1 * | 4/2002 | Gatz et al. .................. 709/203 |
| 2002/0116641 A1 * | 8/2002 | Mastrianni ................... 713/201 |
| 2002/0194586 A1 * | 12/2002 | Gutta et al. .................... 725/10 |
| 2004/0008972 A1 * | 1/2004 | Haken .......................... 386/83 |
| 2005/0278741 A1 | 12/2005 | Robarts et al. |

FOREIGN PATENT DOCUMENTS

| | | |
|---|---|---|
| JP | 09-265478 | 10/1997 |
| JP | 11-015840 | 1/1999 |

(Continued)

OTHER PUBLICATIONS

Takagi, T. et al.,"Conceptual matching and its applications to selection of TV programs and BGMs", IEEE Intern. Conf. on Systems, Man and Cybernetics, vol. 3, p. 269-273, Oct. 1999.*

(Continued)

*Primary Examiner*—Patrice L Winder
(74) *Attorney, Agent, or Firm*—Staas & Halsey LLP

(57) ABSTRACT

An information browse supporting system and method utilized for a plurality of users to browse the information and capable of vitalizing user-to-user communications. The information browse supporting system includes favorite information tables each of which holds the first search condition information inputted by a user, care-fore-others information tables each of which holds the second searching information on a specific user inputted by other users; an control unit for searching, from within browsing target information containing a plurality of information elements, for an information element with respect to a certain user in accordance with the first search condition information in his or her favorite information table and the second search condition information in his or her care-fore-others information table and of presenting to the user a piece of information corresponding to the searched result.

16 Claims, 12 Drawing Sheets

FOREIGN PATENT DOCUMENTS

| | | |
|---|---|---|
| JP | 11-328275 | 11/1999 |
| JP | 11-008810 | 12/1999 |
| JP | 2000-076354 | 3/2000 |
| JP | 2000-105766 | 4/2000 |
| JP | 2000-132559 | 5/2000 |
| JP | 2003-507941 | 2/2003 |
| WO | 01/13633 | 2/2001 |

OTHER PUBLICATIONS

Pazzani, M.J. et al.,"Representation of electronic mail filtering profiles: a user study", ACM Intern. Conf. on Intelligent User Interfaces, p. 202-206, Jan. 2000.*

Junji Tomita, et al., *Realization of Information Providing Agent based on Sorting and Hierarchical Structure*, Computer-Software, Japan Society for Software Science Technology, Nov. 16, 1998, vol. 15, No. 6, pp. 27-38.

Fumio Hattori, *Trend of Agent Communication Technology*, Information Processing, Nov. 15, 1998, vol. 39, No. 11, pp. 1118-1123.

Kazuhiro Miyahara, et al., *Collaborative Information Filtering for Distributed Cooperative Work/Learning Environment*, Graduate School of Information Systems, The University of Electro-Communications, Technical Report of IEICE, Dec. 14, 1996, vol. 96, No. 431, pp. 47-54, ET-96-94 (English Abstract).

Japanese Office Action mailed Dec. 5, 2006 in corresponding Japanese Application No. 2001-160019 (3 pages) (5 pages English translation).

Japanese Office Action mailed Mar. 6, 2007 in corresponding Japanese Application No. 2001-160019 (3 pages) (5 pages English translation).

* cited by examiner

FIG.2

| KEYWORD#1/<br>CONFIDENTIAL FLAG#1 | KEYWORD#2/<br>CONFIDENTIAL FLAG#2 | |
|---|---|---|
| KWa/OFF | | |

| SETTING USER NAME | KEYWORD#1 | KEYWORD#2 | |
|---|---|---|---|
| FATHER | KWa | | |
| MOTHER | KWb | KWc | |

CARE-FOR-OTHERS QUESTIONNAIRE SCREEN

INPUT USER: KENICHI    ADDRESSEE: FATHER ▼

CARE-FOR-OTHERS QUESTIONNAIRE

Q1. GAIN MORE WEIGHT RECENTLY ?
① ② ③ ④ ⑤

Q2. SICKLY COMPLEXION ?
① ② ③ ④ ⑤

Q3: DRINKING WITH SUPPER CONTINUES ?
① ② ③ ④ ⑤

CANCEL    REGISTER

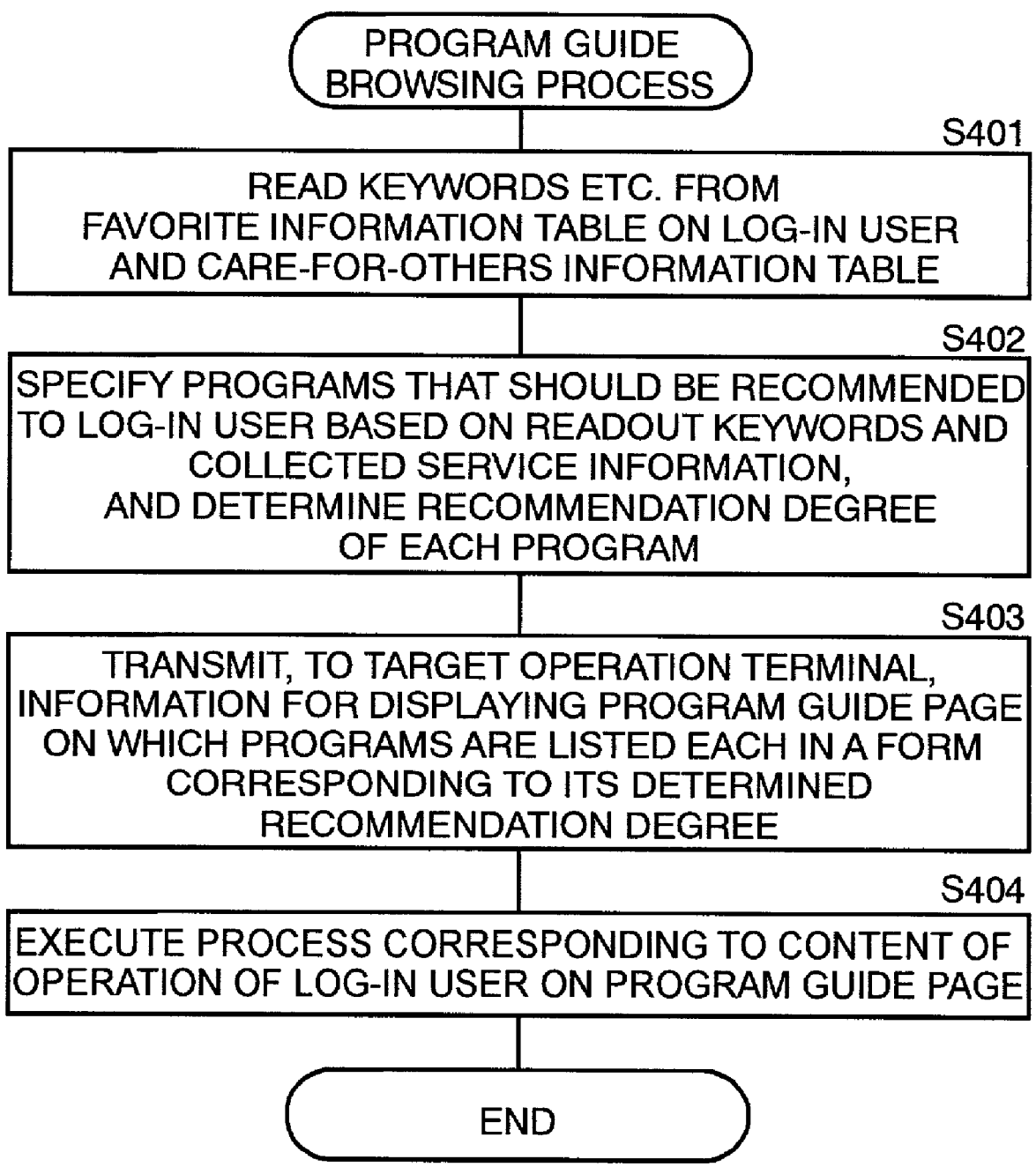

FIG.10

BS DIGITAL TV PROGRAM GUIDE

| TODAY | << >> | 11 | 12 | 13 | 14 | 15 | 16 | 17 |
|---|---|---|---|---|---|---|---|---|
| | | 14:00 | | 15:00 | | 16:00 | | 17:00 |
| (NAME OF BROAD-CASTING STATION) | | (PROGRAM NAME) | | | (PROGRAM NAME) | | (PROGRAM NAME) | |
| (NAME OF BROAD-CASTING STATION) | | (PROGRAM NAME) <PROGRAM RECOMMENDED BY MOTHER> | | | (PROGRAM NAME) | | (PROGRAM NAME) | |
| (NAME OF BROAD-CASTING STATION) | | (PROGRAM NAME) | | | (PROGRAM NAME) | (PROGRAM NAME) | (PROGRAM NAME) | |
| (NAME OF BROAD-CASTING STATION) | | (PROGRAM NAME) | | | (PROGRAM NAME) | | (PROGRAM NAME) | |
| (NAME OF BROAD-CASTING STATION) | | (PROGRAM NAME) | | | (PROGRAM NAME) | | (PROGRAM NAME) | |

- CONTENT OF PROGRAM
- RECOMMENDED PROGRAM LIST
- SEARCH
- RESERVATION FOR RECORDING AND WATCHING
- END

FIG.12

| SENDER | TITLE | DATE | SIZE | RECOMMENDER |
|--------|-------|------|------|-------------|
| ○○○ | INFORMATION FOR ... | yy/mm/dd | 0.2k | |
| △○□ | INVITATION TO ... | yy/mm/dd | 0.3k | MOTHER |
| □□□ | NOTICE OF ... | yy/mm/dd | 0.2k | |
| ○×○ | INFORMATION FOR ... | yy/mm/dd | 0.2k | |

RECEIVING TRAY

END

INFORMATION AND PROGRAMMING BROWSE SHARING METHOD

BACKGROUND OF THE INVENTION

1. Field of the Invention

The present invention relates to an information browse supporting method and system, and to a program for a computer to execute the information browse supporting method. The present disclosure also relates to subject matter contained in Japanese Patent application No. 2001-160019 (filed on May 29, 2001), which is expressly incorporated herein by reference in its entirety.

2. Description of the Related Art

Over the recent years, there have been a great number of enterprises scheming to increase an efficiency of office operations and to enhance a productivity by utilizing software (that is generally known as groupware) for enabling the operations (works) to advance in such a form that a plurality of persons share the information by use of the Internet and in-office LAN. Further, there increase needs for browsing only necessary items of information from a tremendous quantity of information opened to the public on the Internet. For example, as in the case of the clipping service for distributing news concerning the fields registered beforehand and news containing the keywords registered, a service for providing only necessary items of information to the individual (which is generally known as the personalization service) has already come into a practical stage. Moreover, there exist a great number of Web sites on which to provide a service for notifying requesters of fresh pieces of information by E-mails.

The technology is easy to utilize the formation of a variety of categories and, while on the other hand, has a problem that the information to be obtained has a bias to limited categories. Further, the technology described above does not implement a function of providing a sort of care-for-others information showing mutual concerns about (psychological and physical) conditions as, e.g., family members do.

Accordingly, it is a primary object of the present invention, which was devised under such circumstances, to provide an information browse supporting method and system utilized for a plurality of users to browse the information and capable of vitalizing user-to-user communications.

It is another object of the present invention to provide a program executed by a computer to function as an information browse supporting system.

SUMMARY OF THE INVENTION

To accomplish the above objects, according to one aspect of the present invention, an information browse supporting method comprises a first search condition information setting step of setting a condition, inputted by any one of a plurality of users, for searching for information suited to this user, as first search condition information on this user, a second search condition information setting step of setting a condition, inputted by any one of the plurality of users in a way that specifies other user, for searching information suited to this other user, as second search condition information on this other user on this other user, an information searching step of searching, from within browsing target information containing a plurality of information elements, for an information element with respect to a certain user in accordance with the first search condition information set in the first search condition information setting step and the second search condition information set in the second search condition information setting step, and an information presenting step of presenting to a certain user a piece of information corresponding to a searched result with respect to a certain user in the information searching step.

Namely, according to the information browse supporting system of the present invention, for example, supposing that the plurality users are users A, B and C, the search for the information with respect to the user A in the information searching step, involves the use of the first search condition information set as a result of inputting the information by the user A, the second search condition information set as a result of inputting the information by the user B, and the second search condition information set as a result of inputting the information by the user C. Then, the information corresponding to the searched result in the information-searching step is presented to the user A in the information-presenting step.

Thus, according to the information browse supporting system of the present invention, an intention of other user (which is coincident with a content of the information inputted by other user in a way that specifies a certain user in the second search condition information setting step), can be reflected in the information presented to a certain user. Accordingly, the use of the present information browse supporting system enables each user to indirectly recognize that other user shows a kind care for the user himself or herself by browsing the information presented to the same user. As a consequence, the user-to-user communications can be vitalized.

Further, when carrying out the information browse supporting method of the present invention, the second search condition information setting step may involve setting the information inputted in such a form that any one of the plurality of users specifies other user as the second search condition information on the other user together with setting user information indicating the user who inputted the information, and the information presenting step may involve presenting to a user pieces of information on the respective information elements searched with respect to this user, and presenting a piece of information indicating a setting user of the second search condition information on the basis of the setting user information set together with the second search condition information in the second search condition information setting step with respect to the information elements searched by the second search condition information. According to the present information browse supporting system, it is feasible to actualize a platform (environment) where each user browses the information in a way of recognizing that some other user has a kind concern about this browsing user.

Note that the browsing target information processed by the information browse supporting method of the present invention may be any categories of information on condition that it contains a plurality of information elements, and the information present in the information presenting step may be any categories of information on condition that it corresponds to the searched result in the information searching step. Namely, the browsing target information may be set as a group of information elements transmitted via the Internet and also as a group of information elements on broadcasting. Moreover, the information presenting step may involve presenting only the information elements searched in the information searching step and presenting the information containing both of the information representing the information elements searched in the information searching step and the browsing target information.

According to the information browse supporting method of the present invention, the information-presenting step may start operating upon an indication of the user and may also start operating based on the specified schedule. Moreover, the information-searching step may operate just before the information-presenting step operates. The information presenting step and the information searching step may operate at timings independent of each other (for instance, when changing the first and second search condition information, and when changing the contents of the browsing target information, the information searching step may function, and the information presenting step may function when an indication is given from the user).

Moreover, according to the information browse supporting method of the present invention, the first and second search condition information setting steps may operate based on the information inputted to an input device and may operate based on the information inputted via communication media as on the Internet and so forth. Similarly, the information-presenting step may present the information by outputting the information to an information output device such as a display device etc., and may present the information to the user.

The information browse supporting method of the present invention may further comprise a second information searching step of searching, based on the second search condition information set by a certain user with respect to other user in the second search condition information setting step, for an information element suited to this other user from the browsing target information, and checking whether or not the thus searched information element is searched by the first search condition information set in the first search condition information setting step with respect to the other user, and a second information presenting step of presenting to a certain user a piece of information corresponding to a searched result and a checked result with respect to a certain user in the second information searching step.

According to this method, the user who sets the second search condition information with respect to a certain user can communicate with a certain user on the basis of the information presented in the second information presenting step, and hence a group of users of the information can be organized as a small community (such as a family) that is bright and has talks full of topics.

When the second information presenting step and others are added to the information browse supporting method, the first search condition information may contain one or more pieces of information consisting of a keyword and a confidential flag for indicating whether or not a permission of using this keyword is given to other user, and the second information searching step may involve performing the check about the searched information element by use of only the keyword corresponding to the confidential flag contained in the first search condition information set in the first search condition information setting step with respect to other user.

According to another aspect of the present invention, an information browse supporting method comprises a first search condition information setting step of making a server set inputted by a user as a search condition corresponding to this user, a second search condition information setting step of making the server set information by a user as a search condition corresponding to a user other than this user, and a step of receiving from the server a result of searching based on the conditions set corresponding to the users in the first and second search condition information setting steps.

According to a further aspect of the present invention, a program executed by a computer comprises a first search condition information setting process of setting a condition, inputted by any one of a plurality of users, for searching for information suited to this user, as first search condition information on this user, a second search condition information setting process of setting a condition, inputted by any one of the plurality of users in a way that specifies other user, for searching information suited to this other user, as second search condition information on this other user on this other user, an information searching process of searching, from within browsing target information containing a plurality of information elements, for an information element with respect to a certain user in accordance with the first search condition information set in the first search condition information setting process and the second search condition information set in the second search condition information setting process, and an information presenting process of presenting to a certain user a piece of information corresponding to a searched result with respect to a certain user in the information searching process.

The computer executes this program, whereby the computer can function as a system capable of implementing the information browse supporting method of the present invention, and hence the user-to-user computer-based communications can be vitalized.

BRIEF DESCRIPTION OF THE DRAWINGS

These and other objects and advantages of the present invention will become clear from the following description with reference to the accompanying drawings, wherein:

FIG. 2 is an explanatory diagram showing a favorite information table retained by the information browse supporting system in the embodiment;

FIG. 3 is an explanatory diagram showing a care-for-others information table retained by the information browse supporting system in the embodiment;

FIG. 8 is an explanatory diagram showing a care-for-others information input page displayed on the processing target operation terminal when executing the care-for-others information setting process in the questionnaire mode;

FIG. 9 is a flowchart showing a program guide browsing process executed by the information browse supporting system in the embodiment;

FIG. 10 is an explanatory diagram showing a program guide page displayed on the processing target operation terminal when executing the program guide browsing process;

FIG. 12 is an explanatory diagram showing a care-for-others information input page displayed on the processing target operation terminal when executing the E-mail browsing process.

DETAILED DESCRIPTION OF THE PREFERRED EMBODIMENTS

Embodiments of the present invention will hereinafter be described in depth with reference to the accompanying drawings.

Figure 1:
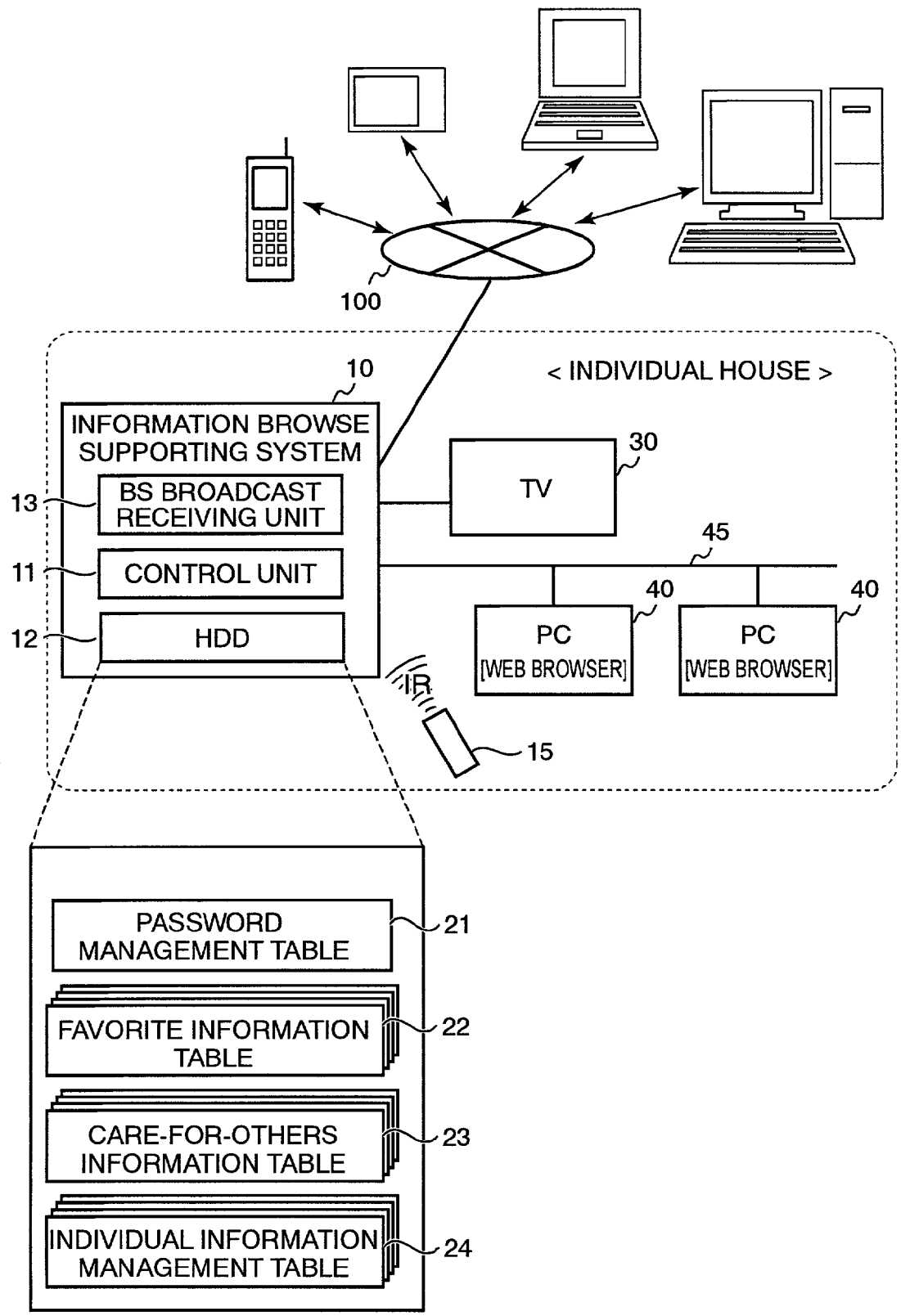
FIG. 1 is an explanatory diagram showing an outline of an architecture of an information browse supporting system in one embodiment as well as showing an available mode thereof.

To start with, an outline of an information browse supporting system in one embodiment of the present invention will be explained referring to FIGS. 1 through 3. FIG. 1 is an explanatory diagram showing an outline of architecture of the information browse supporting system in this embodiment as well as showing an available mode thereof. FIGS. 2 and 3 are explanatory diagrams respectively showing a favorite information table and a helpful-care-for-others information table retained by the information browse supporting system 10.

The information browse supporting system 10 in one embodiment of the present invention is a system that implements a function as a BS (Broadcasting Satellite) digital tuner (capable of recording), a function as a Web server and a function as a Web mail server. The information browse supporting system 10 is a system installed in a connection mode of being connected to a TV 30 and an Internet 100 and further connected via a LAN (Local Area Network) cable 45 to an unknown number (including "0") of personal computers (PCs) 40 (incorporating a Web browser). The information browse supporting system 10 is also a system based on the assumption of being used in common by family members (who will hereinafter be called users) as residents of an individual house. Note that the information browse supporting system 10 takes the same external configuration as the BS digital tuner (Set-top Box) generally available on the market.

The information browse supporting system 10 is defined as a system capable of providing each user with a platform (environment) of being able to administer a user's own schedule and pieces of information (addresses and so forth) on acquaintances, and transfer and receive the information to and from other users, and providing a platform of being able to easily search for a BS digital broadcasting program suited to a user's own taste, and search for an E-mail and a Web page important to the user himself or herself among Web pages opened to the public on the Internet 100 and self-addressed E-mails (such as E-mails for advertisements) in a way that enables the user to recognize how much other users show a helpful care for the user himself or herself. Further, the information browse supporting system 10 implements a function of notifying a user taking a helpful care (solicitude) for others (who is hereinafter be called a care-taker) of a BS digital broadcasting program preferable enough to be recommended to a helpful care target (receiving) user (who is hereinafter be called a care recipient) for watching the program.

Moreover, the information browse supporting system 10 is a system operable (usable) by each user through a remote controller 15 (which is hereinafter abbreviated to the RC 15), terminal devices (such as a personal computer, a mobile telephone, a PDA (Personal digital Assistant) and so on) capable of browsing the Web page opened to the public on the Internet 100 and the PC 40.

Note that the information browse supporting system 10 is constructed of a control unit 11 including a CPU (Central Processing Unit) and its peripheral circuits (communication circuits for a ROM, a RAM and a LAN, and a communication circuit for the Internet), a HDD (Hard Disk Drive) 12 for storing programs which the control unit 11 (CPU) functions based on, four categories of tables (which will be explained in details later on) and recorded program data, and a BS digital receiving unit 13 as a circuit for receiving the BS digital broadcast. In other words, a hardware architecture of the information browse supporting system 10 is substantially the same as that of the personal computer (main components) capable of receiving the BS digital broadcast, which has already been available on the market. Therefore, a detailed explanation of the hardware architecture of the information browse supporting system 10 is herein omitted. Further, the RC 15 is a device manufactured for the information browse supporting system 10 and having the same hardware architecture and functions as those of a remote controller attached to the existing BS digital tuner, and hence a detailed description of the RC15 is likewise omitted.

The HDD 12 of the information browse supporting system 10, of which the actual operation (use) is started, is stored with a piece of password management table 21, n-pieces (n is normally an integer of 2 or larger, which will be mentioned in depth later on) favorite information tables 22, n-pieces of care-for-others information tables 23, and n-pieces of individual information management tables 24. Note that among these tables the table existing within the HDD 12 before the start of the actual operation is only the password management table 21 (that is, however, stored with nothing).

The password management table 21 is a table for storing a user name defined as information used for identifying the user and indicating who is the care-taker, and a User ID and a password defined as pieces of information for authenticating a user identity for every user.

When starting the operation of the information browse supporting system 10, normally a specified user sets the user IDs and so forth of the users in the password management table 21. This setting is, though its detailed description is omitted, done by use of the RC 15 or the PC 40. Then, if information on a certain user is set in the password management table 21 when performing this setting, a favorite information table 22, a care-for-others information table 23 and an individual information management table 24 (none of these tables is stored with anything substantial) with respect to the user concerned (precisely each table corresponding to the user ID of this user), are generated on the HDD 12.

The favorite information table 22 is, as schematically illustrated in FIG. 2, a table for storing some keywords together with confidential flags, respectively. A keyword stored in the favorite information table 22 with respect to a certain user may be defined as information used for searching for a broadcasting program suited to the taste of the user, and for a Web page and an E-mail important to the user concerned. The confidential flag may be defined as information for indicating ON/OFF states as to whether the user (reference) by other user with the corresponding keyword is inhibited or not. Further, the favorite information table 22 with respect to a certain user is structured to the user to change the contents (set the keyword etc.).

The care-for-others information table 23 is, as schematically shown in FIG. 3, a table capable of storing a plurality of records (which are generically termed care-for-others information) each consisting of some keywords and a name of setting user. The keyword stored in the care-for-others information table 23 with respect to a certain user, is also used for searching for the suited-to-the-user information (the broadcasting program suited to the taste of the user and the E-mail important to the user). The care-for-others information table 23 with respect to a certain user is, however, structured to store the care-for-others information containing some keywords and the user name as a name of setting user who operates, as a user other than the user related to this table 23, the information browse supporting system.

The individual information management table 24 with respect to a certain user is stored with a schedule of this user, addresses of acquaintances of the same user, notifications from other users and an E-mail account of this user. Moreover, the individual information management table 24 with respect to a certain user is further stored with recommended program information for every care-recipient, which is defined as information on broadcasting programs preferable enough to be recommended to the care-recipient for watching the program.

Based on the premise of what has been discussed so far, the functions of the information browse supporting system 10 will be specifically explained.

Note that the information browse supporting system 10 involves the use of the Web page in the case of the operations through the Internet 100 and using the PC 40. Then, as known well, the mobile telephone has a limit in terms of a size of the Web page that can be browsed by the user, and therefore the information browse supporting system 10 has an architecture capable of providing the Web pages for the mobile telephone and the Web pages for the typical computer. Further, when the information browse supporting system 10 is operated by the RC15, a screen for operation is displayed on the TV 30. This screen is essentially the same as the Web page displayed on a display of the computer when operating the information browse supporting system 10 by the typical computer, and is suited to the operation with the RC 15.

In short, the information browse supporting system 10, though operable (usable) by the user through the RC15, the terminal devices capable of browsing the Web pages and the PC40, has an architecture of implementing the functions corresponding to the categories of the devices used for the above operation. The basic operating procedures thereof are, however, the same whatever category of the device used for the operation may be. Therefore, the following discussion on the functions of the information browse supporting system 10 will be focused on a case where the device (which is hereinafter referred to as an operation terminal) used for operating the information browse supporting system 10 has no particular limit with respect to the Web pages that can be browsed.

When using the information browse supporting system 10 by the operation terminal, the user inputs a predetermined URL (Uniform Resource Locator), whereby the operation terminal functions to transmit, to the LAN cable 45 or the Internet 100, a HTTP (HyperText Transfer Protocol) request (which is hereinafter called a log-in page request) that is to be received and processed by the information browse supporting system 10 (the control unit 11).

Figure 4:
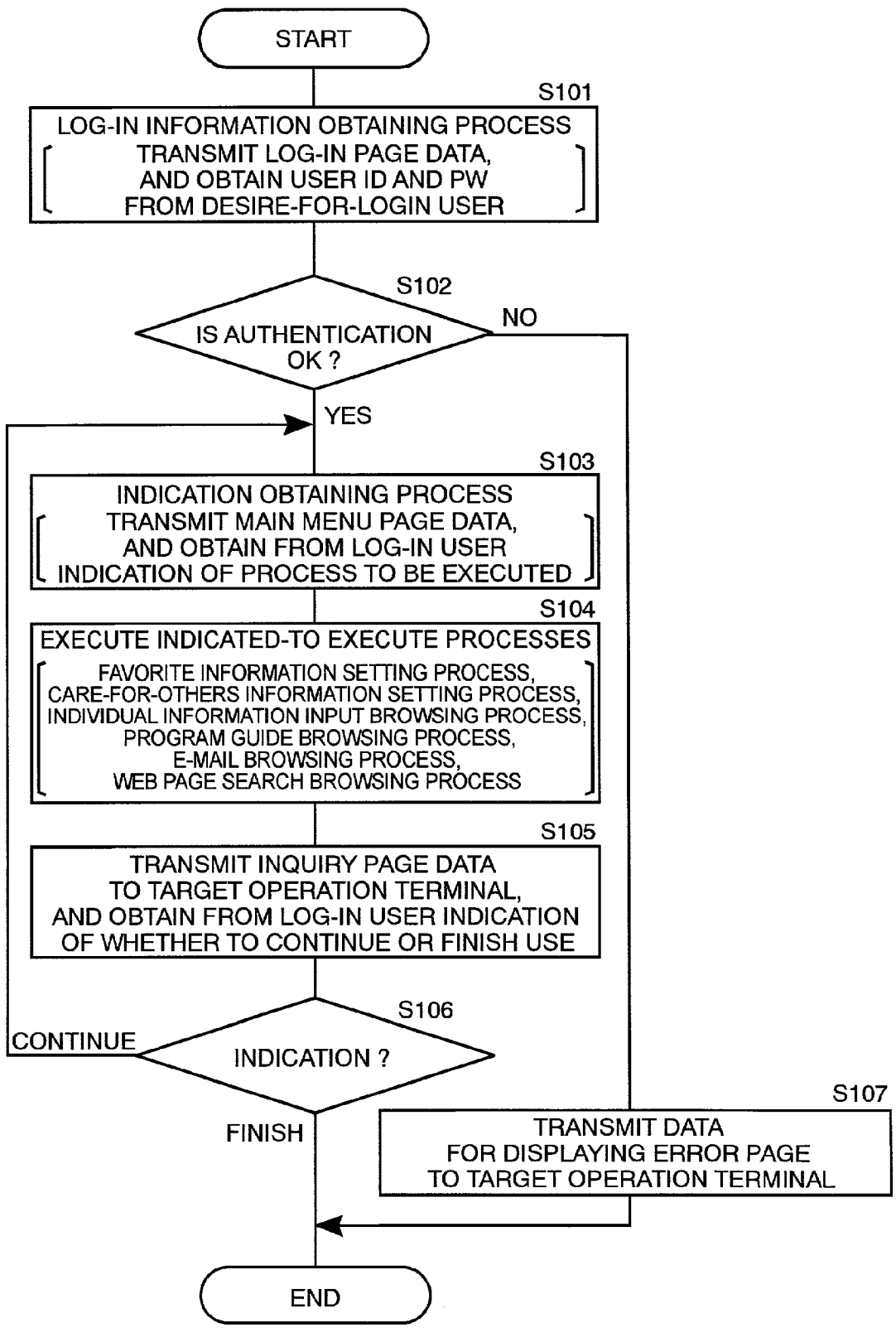
FIG. 4 is a flowchart showing entire operating steps of the information browse supporting system in the embodiment.

On the other hand, the control unit 11 of the information browse supporting system 10 always monitors a receipt of a log-in screen request and, when receiving the log-in page request, executes processes in steps shown in FIG. 4.

To be specific, when receiving the log-in page request, the control unit 11 executes a log-in information obtaining process (step S101). When in this log-in information obtaining process, the control unit 11 at first transmits the log-in page data to a sender of the log-in page request. Herein, the log-in page data is defined as information for displaying a Web page (which is hereinafter called a log-in page) containing a user ID input box, a password input box, a "transmit" button and others on the operation terminal (which is hereinafter termed a processing target operation terminal) as the sender of the log-in request. Then, the control unit 11, when obtaining the user ID and the password inputted o the processing target operation terminal (the operation terminal with the log-in page displayed receives the information transmitted when the "transmit" button is pressed, finishes step S101 (the log-in information obtaining process).

Note that when using the information browse supporting system 10 through the mobile telephone capable of browsing the Web pages, the user inputs a URL different from the URL described above to the mobile telephone, whereby a mobile telephone oriented log-in page request is transmitted to on the Internet 100. The information browse supporting system 10 receiving this mobile telephone oriented log-in page request starts the mobile telephone oriented log-in page request corresponding to the process in FIG. 4. In step corresponding to step S101, the information browse supporting system 10 executes a process for displaying a Web page suited to a mobile telephone on the mobile telephone having an access thereto. Further, when using information browse supporting system 10 through the RC 15, the user performs the operation in predetermined steps starting with clicking a menu button provided on RC15. The information browse supporting system 10 recognizing that the operation described above has been done, starts executing a process for the RC15, which corresponds to the process in FIG. 4. The information browse supporting system 10 executes a process for displaying on the TV 30 a screen capable of inputting the user ID and the password (the screen containing a software keyboard for inputting respective items of information). A relationship between steps which are explained later on and the corresponding steps in the process for the mobile telephone or the RC 15, are the same, and therefore the following discussion does not include an explanation of the process for the mobile telephone or the RC 15.

The control unit 11 having completed the log-in information obtaining process judges whether a couple of the user ID and the password obtained is stored in the password management table 21 (step S102). If this couple of information is not stored in the password management table 21 (step S102; NO), the control unit 11 transmits to the processing target operation terminal a piece of information for displaying an error page defined as a Web page for notifying the accessing user (the operator of the operation terminal) of the non-storage (step S107), and comes to an end of the process shown therein. Whereas if the couple of the user ID and the password obtained is stored in the password management table 21 (step S102; YES), the control unit 11 executes an indication obtaining process for receiving an indication of the process of which an execution should be started from the user who inputted the user ID etc. (who is hereinafter referred to as a log-in user) (step S103). When in this indication obtaining process, the control unit 11, to start with, transmits main menu page to the processing target operation terminal, thereby displaying on the processing target operation terminal a main menu page on which the operator (i.e., the log-in user) is able to select a process executed by the information browse supporting system 10. Then, the control unit 11, when detecting such an event that an operation of indicating an execution of a certain process is done on the processing target operation terminal (when receiving information showing a result of selection by the log-in user, which has been transmitted by the operation terminal on which the main menu page is displayed), finishes step S103 (an indication obtaining process), and executes in step S104 the process of which the execution is indicated by the log-in user. In advance of a detailed discussion on the processes that may be executed in step S104, the function of the information browse supporting system 10 after completing step S104 will be explained.

After the completion of step S104, in subsequent step S105, the control unit 11 transmits inquiry page data, thereby displaying, on a communication target operation terminal, an inquiry page for inquiring of the log-in user whether the use of the information browse supporting system 10 continues or not. Thereafter, the control unit 11, when the information showing the result of selection by the log-in user is transmitted from the operation terminal on which the inquiry page is displayed, finishes step S105. Then, the control unit 11, if the indication by the log-in user is to continue the use (step S106; continued), makes a loopback to step S103, and executes again the indication obtaining process. By contrast, if the indication by the log-in user is to end the use (step S106; end), the control unit 11 finishes the processes starting with receiving the log-in page request in FIG. 4.

The respective processes that may be executed in step S104 will hereinafter be explained in depth.

According to the present information browse supporting system 10, the processes (that may be executed in Step S104) of which executions can be indicated on the main menu page, are a favorite information setting process, three categories of care-for-others information setting processes (in a character input mode, a voice input mode and a questionnaire mode), an individual information input browsing process, a program guide browsing process, an E-mail browsing process and a Web page search browsing process.

The favorite information setting process is a process of which the execution should be indicated by the user when setting and changing the keyword used for searching the broadcasting program suited to the taste of the user and the E-mail important to the user (when setting and changing the keyword in the favorite information table 22).

When in the favorite information setting process, the control unit 11 transmits, to the processing target operation terminal, a piece of information for displaying a Web page (which will hereinafter be called a favorite information setting page) containing a plurality of text boxes for inputting respective keywords, a plurality of check boxes for specifying the confidential flags with respect to the keywords, and a "completion-of-setting" button and others. Note that the control unit 11, if some keywords and confidential flags have already been set in the favorite information table 22 related to the log-in user, transmits information for displaying the favorite information setting page on which those keywords and flags are displayed.

Then, the control unit 11, when receiving information showing some set-by-user keywords and corresponding confidential flags which information is to be transmitted when the processing target operation terminal with the favorite information setting page displayed detects the click on the "completion-of-setting" button, rewrites the contents of the related-to-the-login-user favorite information table 22 into those corresponding to the above information, and finishes the step S104 (the favorite information setting process).

Further, among the three categories of care-for-others information setting processes of which the executions can be indicated from on the main menu page, each of the care-for-others information setting processes in the character input mode and in the voice input mode is a process of which the execution should be indicated by a user having a concern about other user.

Figure 5:
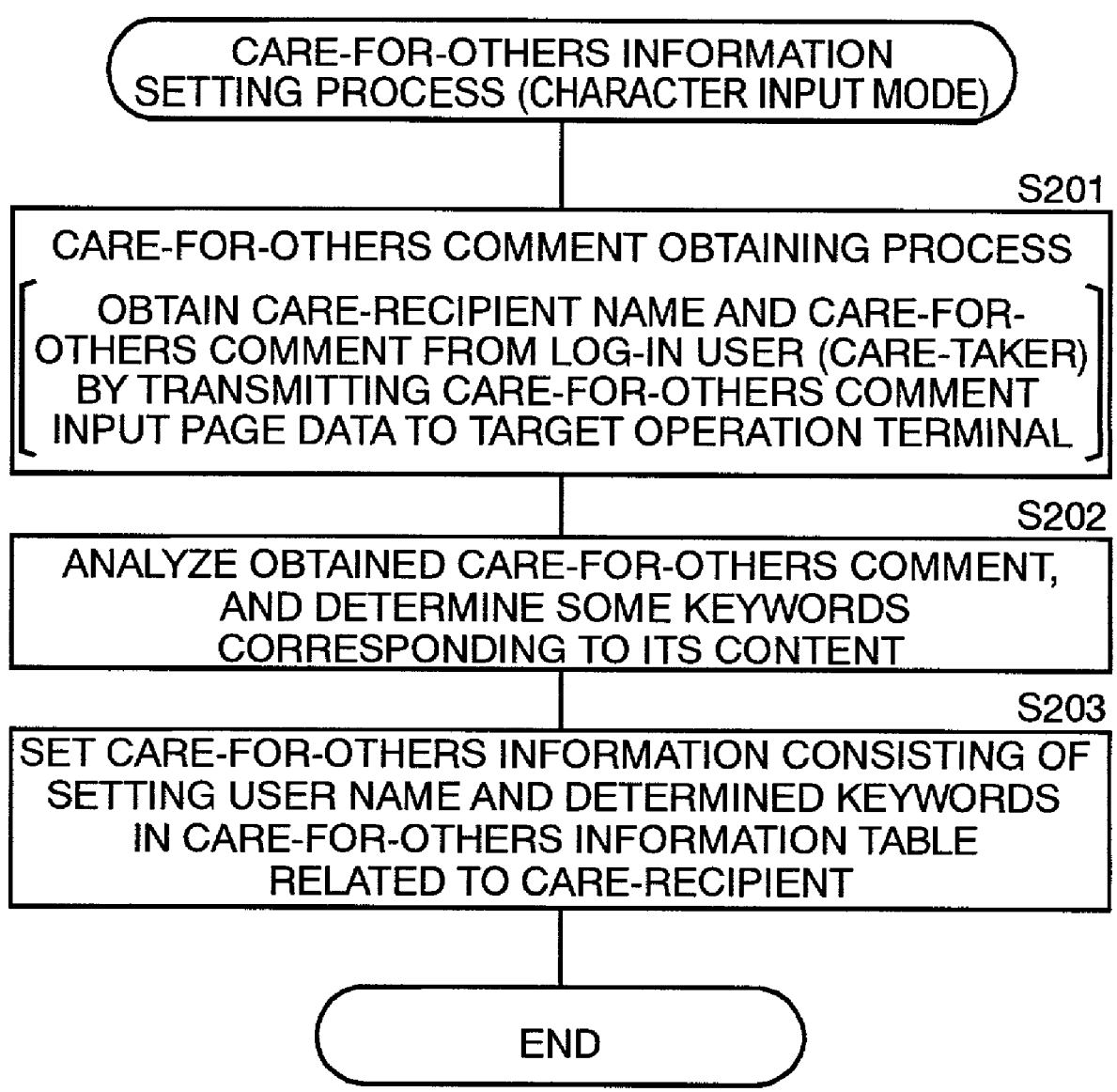
FIG. 5 is a flowchart showing a care-for-others information setting process in a character input mode, which is executed by the information browse supporting system in the embodiment.

FIG. 5 shows an operating procedure of the control unit 11 when in the care-for-others information setting process in the character input mode. As shown in FIG. 5, when in the care-for-others information setting process in the character input mode, the control unit 11 at first executes a care-for-others comment obtaining process (step S201). When in this care-for-others comment obtaining process, the control unit 11 transmits care-for-others comment input page data to the processing target operation terminal, thereby displaying on the processing target operation terminal a Web page (which is hereinafter be referred to as a care-for-others comment input page) containing a setting usr name display box 71, a care-recipient name selection box 72, a care-for-others comment input box 73, a "register" button 74 and so on. Note that the control unit 11 has the care-for-others comment input page displayed, which contains the setting user name display box 71 where a name of the log-in user ("mother" in FIG. 6) is displayed as the care-for-others comment input page data, and the care-recipient name selection box 72 (which is a so-called drop-down list box: "Kenichi" is selected in FIG. 6) in which any one of the user names excluding the name of the log-in user himself or herself that are stored in the password management table 21.

The log-in user indicating the execution of the care-for-others information setting process in the character input mode, manipulates the care-recipient name selection box 72 on the care-for-others comment input page described above, thus displaying a name of the user about which log-in user has a concern in the care-recipient name selection box 72. Then, the log-in user inputs what he or she has the concern about in the natural language (normal sentences) to the care-for-others comment input box 73. Subsequently, the log-in user clicks a "register" button 74.

With such a series of operations, the operation terminal on which the care-for-others comment input page transmits, onto the network (the LAN cable 45 or the Internet 100), the information containing the care-for-others comment defined as character information inputted to the care-for-others comment input box 73 and the name of the care-recipient as the user name displayed in the care-recipient name selection box 72, which information is to be received by the information browse supporting system 10.

The control unit 11 receiving the information containing the care-for-others comment and the care-recipient name finishes the care-for-others comment obtaining process (step S201 in FIG. 5). In subsequent step S202, the control unit executes a process for analyzing (interpreting) a content of the care-for-others comment (which is a kind of auto summarizing process), thereby determining some keywords (e.g., "stress" and "health") with which the information that should be browsed by a user who might be in such a psychological and physical condition as to be assumed from the content of that care-for-others comment. Note that the determination of the keyword involves the use of methods such as computing a word-to-word correlation and join degree by, for example, text mining, associative analysis etc. which are generally performed based on the natural language inputted as the comments, and determining as a keyword the word obtained as a result of this computing.

Then, the control unit 11 sets the care-for-others information consisting of some keywords determined and the setting user name (the log-in user name) in the care-for-others information table 23 corresponding to the care-recipient name (step S203), and finishes the care-for-others information setting process. Note that the control unit 11, if the care-recipient information set by the same user has already existed, executes a process of setting the care-recipient information of this time as a substitute for the existing care-recipient information in the care-for-others information table 23 in this step S203.

Moreover, when in the care-for-others information setting process in the voice input mode, the control unit 11 executes a process having substantially the same content as the care-for-others information setting process in the character input mode except for a point that the care-for-others comment is inputted by a voice. To be specific, when in the care-for-others information setting process in the voice input mode, the control unit 11, in step corresponding to step S201, displays on the processing target operation terminal a Web page provided with an area (box) in which the log-in user is able to specify (select) a name of the care-recipient, and with buttons for completing the selection for the care-recipient and for indicating a start of inputting the voice. Then, the control unit 11, when the information showing he care-recipient name is transmitted upon clicking the button concerned, shifts to a state of accepting the voice input and stores voice data for a predetermined period of time.

Thereafter, the information browse supporting system 10, in step corresponding to step S202, converts the stored voice data into character information, and deals with the character information as a care-for-others comment, thus determining some keywords. Then, the control unit 11 in step corresponding to step S203, sets some keywords determined and the setting user name in the care-for-others information table 23 corresponding to the care-recipient name acquired, and comes to an end of the care-for-others information setting process in the voice input mode.

It is to be noted that this care-for-others information setting process in the voice input mode is provided in order for users unsuitable for manipulating the keyboard to easily set the care-for-others information by use of the typical computer (incorporating a microphone) and for the general users to easily set the care-for-others information by the mobile telephone on which the inputting of the character information is time-consuming.

As described above, the care-for-others information setting processes in the character and voice input modes are processes of which the executions should be indicated by the user (having a desire-to-input care-for-other comments) who has the concern about the other user. By contrast, the care-for-others information setting process in the questionnaire mode is a process of which the execution should be indicated by the user who has no particular desire-to-input care-for-others comment (this sort of comment does not occur to the user).

Figure 7:
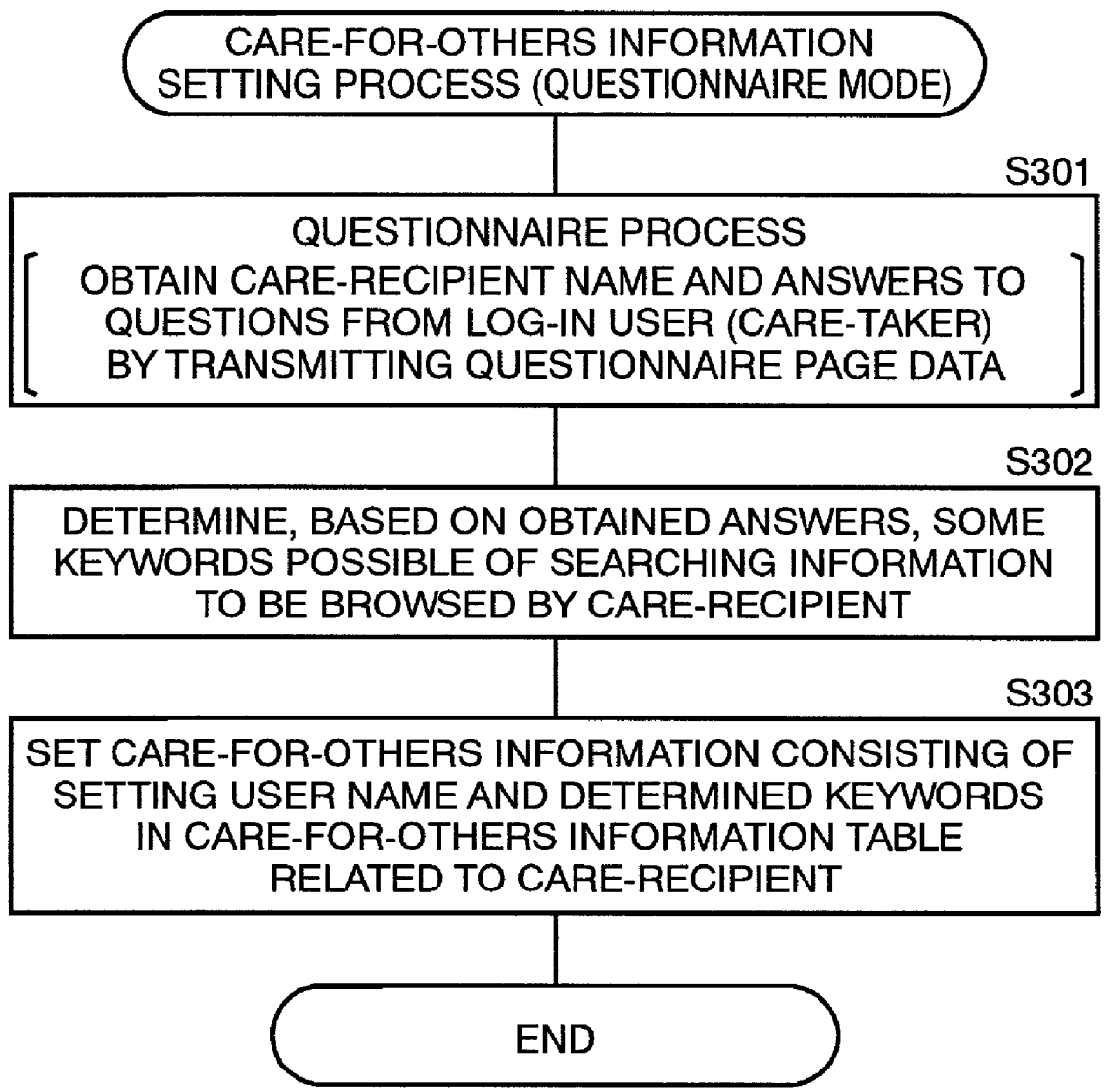
FIG. 7 is a flowchart showing a care-for-others information setting process in a questionnaire mode, which is executed by the information browse supporting system in the embodiment.

A content of the care-for-others information setting process in the questionnaire mode will be explained referring to FIGS. 7 and 8. FIG. 7 is a flowchart showing the care-for-others information setting process in the questionnaire mode. FIG. 8 is an explanatory diagram showing the care-for-others input page displayed on the processing target operation terminal when the care-for-others information setting process in the questionnaire mode is executed.

Figure 6:
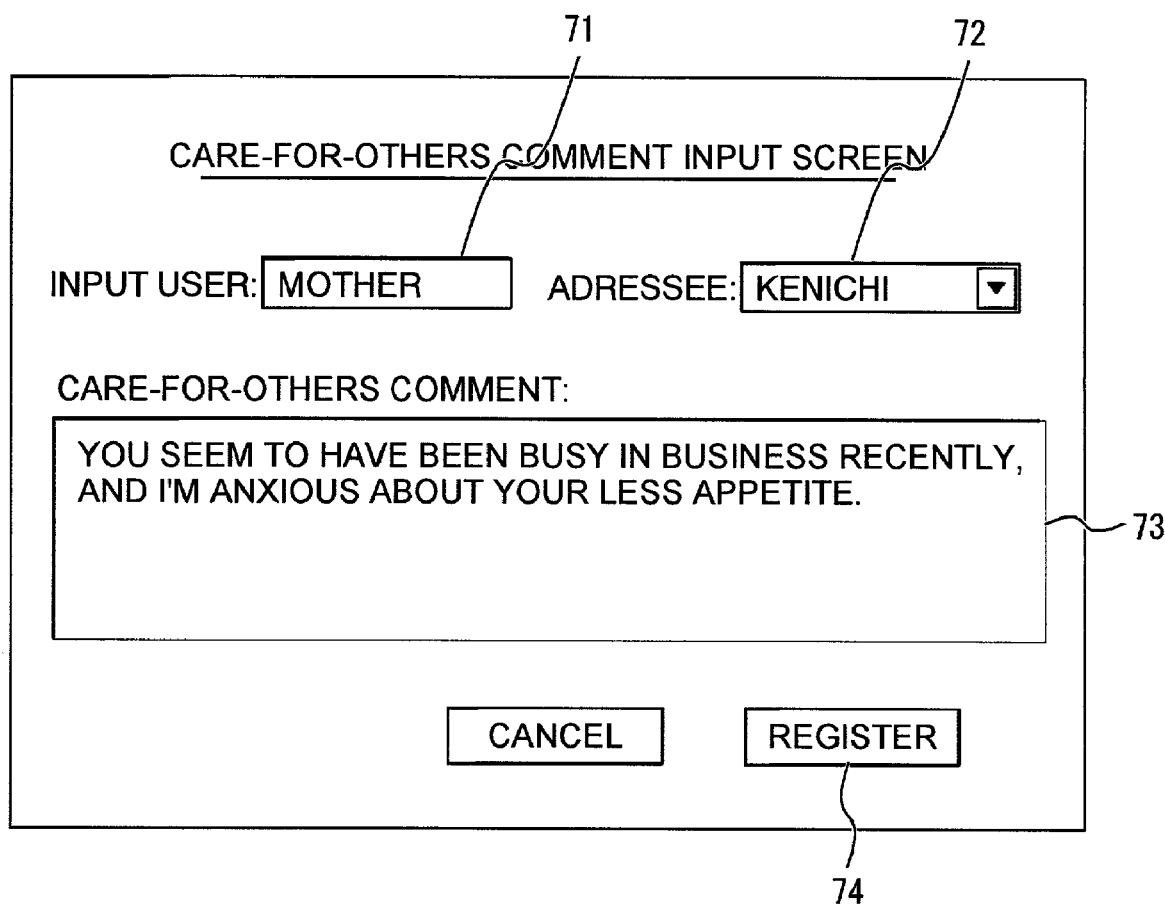
FIG. 6 is an explanatory diagram showing a care-for-others information input page displayed on a processing target operation terminal when executing the care-for-others information setting process in the character input mode.

As shown in FIG. 7, when in the care-for-others information setting process in the questionnaire mode, the control unit 11, to begin with, executes a questionnaire process (step S301). In this questionnaire process, the control unit 11 transmits questionnaire page data to the processing target operation terminal, thereby displaying on the processing target operation terminal a Web page (which is hereinafter called a questionnaire page) provided with, as schematically shown in FIG. 8, a setting user name display box 81, a care-recipient name selection box 82, an questionnaire area 83, a "register" button 84 and so forth. The setting user name display box 81 and the care-recipient name selection box 82 provided on this questionnaire page have the same items of entries (functioning the same) as those in setting user name display box 71 and the care-recipient name selection box 72 displayed on the care-for-others comment input page (FIG. 6). Then, the questionnaire area 83 is, as obvious from FIG. 8, an area where a variety of questions are given, and answers ("1"-"5") to each of these questions are selectable. Further, the questions put in the questionnaire area 83 are schemed to grasp psychological and physical conditions of the care-recipient from the answers (and therefore keywords enabling the information suited to the care-recipient to be searched, can be also specified).

The log-in user indicating the execution of the care-for-others information setting process in the questionnaire mode, manipulates the care-recipient name selection box 82 on the questionnaire page described above, thus displaying a name of the target user in the care-recipient name selection box 82 and selecting an answer to each question put in the questionnaire area 83. Then, the log-in user clicks (presses) the "register" button 84.

Upon the click on the "register" button 84, the processing target operation terminal with the questionnaire page displayed thereon transmits onto the network the information in a predetermined format that is to be received by the information browse supporting system 10, the information containing the answers to all the questions and the care-recipient name entered in the care-recipient name selection box 82.

The control unit 11 receiving this item of information finishes the questionnaire process (step S301 in FIG. 5). In subsequent step S302, the control unit 11 determines some keywords making it possible to search for the information to which the care-recipient should refer, from the answers to the respective questions that are contained in the information described above. Then, the control unit 11 enters the some keywords determined and the setting user name (the log-in user name) in the care-for-others information table 23 corresponding to the care-recipient name (step S303), and finishes the care-for-others information setting process in the questionnaire mode.

The next discussion will be focused on a program guide browsing process, an E-mail browsing process, a Web page browsing process and an individual information setting browsing process.

The discussion starts with touching on the program guide browsing process.

FIG. 9 shows operating steps of the control unit 11 when in the program guide browsing process. As shown in FIG. 9, in the program guide browsing process, the control unit 11 reads all the keywords set in the favorite information table 22 related to the log-in user, and further reads all pieces of care-for-others information (containing the keywords and the setting user name) set in the care-fore other information table 23 pertaining to the log-in user (step S401). Subsequently, the control unit 11, based on the readout keywords and service information retained at that point of time, searches for programs (of which program names and captions contain the keywords entered in the favorite information tables 22) and programs (of which program names and captions contain the keywords entered in the care-for-others information table 23) that should be, other users consider, watched by the log-in user (step S402). Note that the service information indicates a broadcasting time and a title of each of the programs that are always broadcast within a predetermined period by the BS digital broadcast. Further, in this step S402, the control unit 11 also executes a process of determining a recommendation degree corresponding to a hit keyword count with respect to each of the searched programs. Specifically, the control units 11 executes the process of adding a value obtained by multiplying the number of hit keywords set in the care-for-others information table 23 by "1.5" to the number of hit keywords set in the favorite information table 22, and calculating as recommendation degree a value (if over "5", however, the value is "5") obtained by rounding off decimals of the added value. In short, the control unit 11 computes (determines) the recommendation degree in such a procedure that if the hit keyword counts are equal, the recommendation degree of the program having a larger number of keywords in the care-for-others information table 23, which are contained in the hit keywords, takes a larger value.

Then, the control unit 11 transmits to the processing target operation terminal a piece of information for displaying a program guide page on which pieces of information on the searched programs are sorted in a format corresponding to the recommendation degrees (step S403). To be more specific, in the process in this step S403, the program guide page as schematically illustrated in FIG. 10, i.e., the program guide page on which the programs searched in step S402 are colored (screened by meshing in FIG. 10) corresponding to the recommendation degrees, and the programs searched by the keywords entered in the care-for-others information table 23 have padding of information ("recommended-by-mother programs) implying the keyword setting user), is displayed on the processing target terminal.

Thereafter, the control unit 11 executes processes corresponding to contents of the operations on the program guide page, such as a process of displaying the program guide page with different dating, a process of displaying detailed information on the specified programs, a process of displaying a process of displaying a program guide page showing only the programs searched in step S402, and a process of accepting a recording reservation and a hear-and-watch reservation (step S404 in FIG. 9). Then, when indicated to finish, the control unit 11 finishes step S404 and the program guide browsing process.

Next, the E-mail browsing process will be explained.

Figure 11:
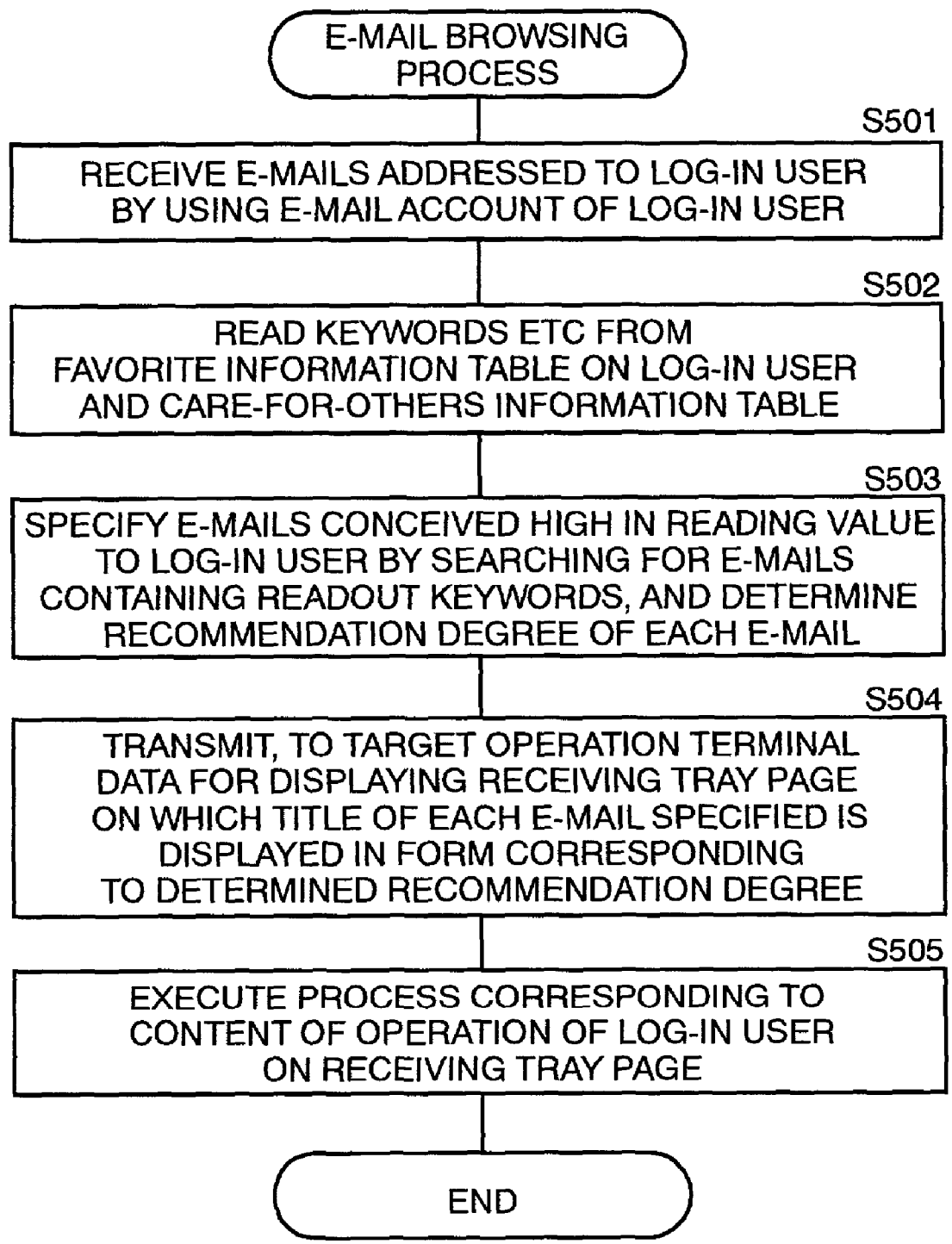
FIG. 11 is a flowchart showing an E-mail browsing process executed by the information browse supporting system in the embodiment.

FIG. 11 shows operating steps of the control unit 11 when in the E-mail browsing process. As shown in FIG. 11, in the E-mail browsing process, the control unit 11 receives E-mails addressed to the log-in user from a mail server subscribed by the log-in user and stores these mails according to the E-mail account entered in the individual information management table 24 of the log-in user (step S501). Subsequently, the control unit 11 reads all the keywords entered in the favorite information table 22 related to the log-in user, and further reads all pieces of care-for-others information (the keywords and the setting user name) set in the care-for-others information table 23 pertaining to the log-in user (step S502). Then, the control unit 11 searches for, based on these keywords, the E-mails (containing the keywords set in the favorite information table 22 or in the care-for-others information table 23) conceived high in reading value to the log-in user from all the E-mails received this time (step S503). Further, in step S503, the control unit 11 executes the process of computing the recommendation degree of each of the E-mails searched in the same way as done in step S402 described above.

Then, the control unit 11 transmits to the processing target operation terminal a piece of information for displaying a receiving tray page in which titles etc. of the E-mails searched are shown in a format corresponding to the recommendation degree (step S504). To be specific, in the process in this step S504, the control unit 11 displays on the processing target operation terminal a receiving tray page on which, as schematically shown in FIG. 12, the E-mails searched in step S503 are colored (screened by meshing in FIG. 12) corresponding to the recommendation degree, and the E-mails searched by the keywords set in the care-for-others information table 23 contain the information indicating the keyword setting user ("mother" in FIG. 12).

Thereafter, the control unit 11 executes processes corresponding to the contents of the operations on the receiving tray page, such as a process of displaying actually the contents of the E-mails on the processing target operation terminal, and a process of deleting the E-mails (step S505 in FIG. 11). Then, when indicated to finish, the control unit 11 finishes step S505 and the E-mail browsing process.

Further, when in the Web page search browsing process, the control unit 11 searches for Web pages each containing the keywords in the favorite information table 22 related to the log-in user and in the care-for-others information table 23 from the Web pages within some Web sites previously registered y the log-in user, and determines the recommendation degrees of the respective Web pages in the steps already explained. Then, the control unit 11 displays on the processing target operation terminal a result-of-search page on which some items (which are hereinafter termed titles) of the contents of the searched Web pages are sorted in sequence of the recommendation degrees, the respective titles are displayed in a form corresponding to the recommendation degrees, and the setting user names are also displayed with respect to the titles of the Web pages searched by the keywords in the care-for-others information table 23. Then, the control unit 11 executes processes corresponding to the contents of the operations on the result-of-search page, such as a process of displaying actually all the contents of the searched Web pages on the processing target operation terminal. Then, when indicated to finish, the control unit 11 finishes the Web page search browsing process.

Next, the individual information setting browsing process will be described. Note that the individual information setting browsing process is a process of setting and browsing the contents of the individual information management table. This individual information setting browsing process involves executing processes of setting an browsing the schedules, addresses and notifications, however, contents of these processes are the same as the processes implemented by the computer into which a typical scheduler is installed, and hence the explanation thereof is omitted.

Figure 13:
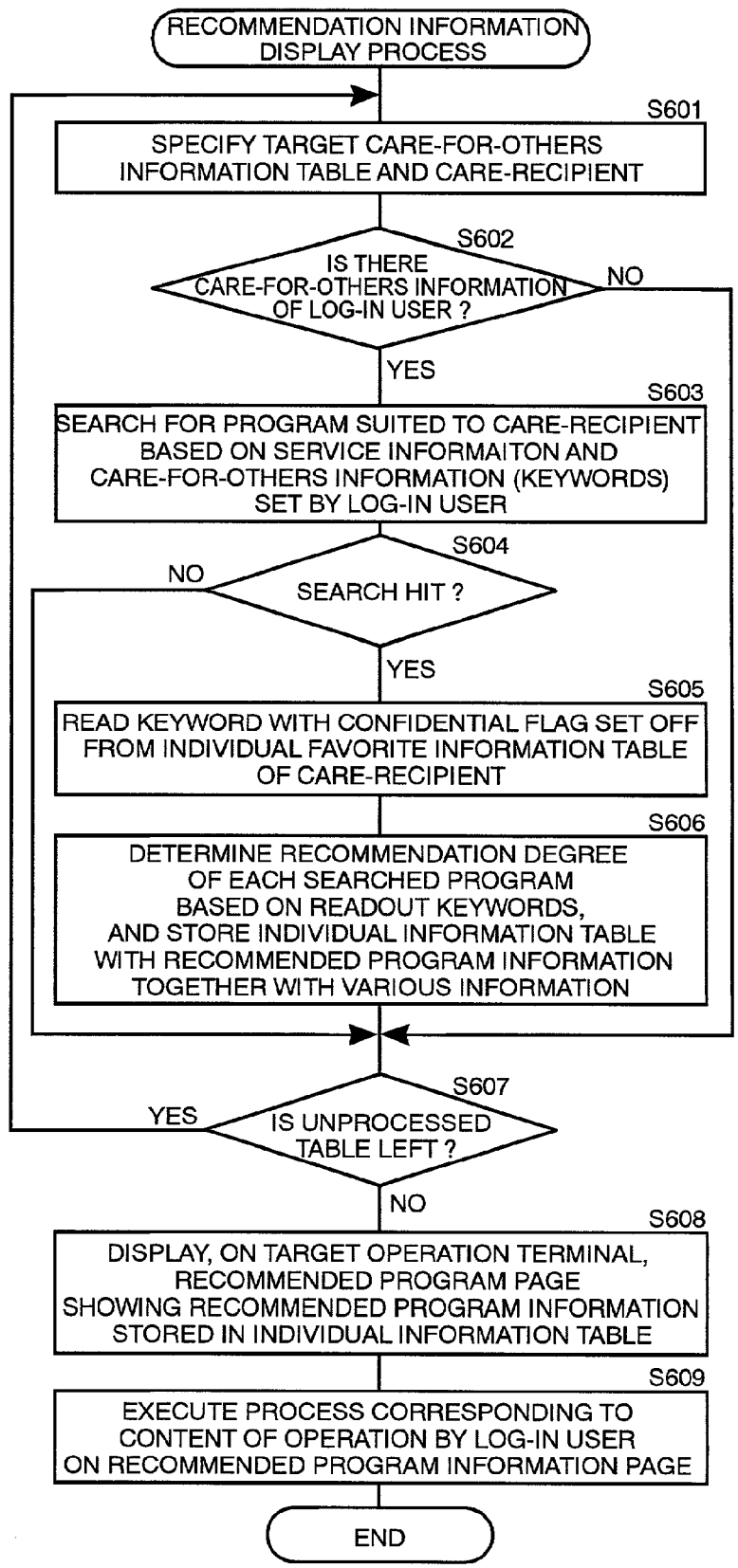
FIG. 13 is a flowchart showing a recommended program information re-displaying process executed by the information browse supporting system in the embodiment.

When in the individual information setting browsing process, the control unit 11 transmits a piece of information for displaying a menu page for setting the individual information to the processing target operation terminal. On this menu page, there can be executed a variety of processes of setting the schedule and address and doing the browse, and a recommended program information displaying process of displaying recommended program information. When indicated to execute the recommended program information displaying process, the control unit 11 functions in steps shown in FIG. 13.

To be specific, the control unit 11, to begin with, specifies a first care-for-others information table 23 (which is the oldest in creation time) not related to the log-in user as a processing target care-for-others information table 23, and further specifies a care-recipient (identified by the user ID stored as one element of a mapping in the process target care-for-others information table 23) (step S601). Then, the control unit 11 judges whether or not the care-for-others information entered by the log-in user is set in the processing target care-for-others information table 23 (step S602). If the care-for-others information entered by the log-in user is not set in the processing target care-for-others information table 23 (step S602; NO), the control unit 11 judges whether or not there are left unprocessed processing target care-for-others information tables 23 related to users other than the log-in user (step S607). If the unprocessed processing target care-for-others information tables 23 are left (step S607; YES), the control unit 11 loops back to step S601 and re-executes the processing with respect to the next care-for-others information table 23.

On the other hand, if the care-for-others information entered by the log-in user is set in the processing target care-for-others information table 23 (step S602; YES), the control unit 11, based on the keywords contained in the care-for-others information and the service information, searches for programs suited to the care-recipient (step S603).

If the search for the program is hit (step S604; YES), the control unit 11 reads all the keywords with the confidential flags set OFF within the favorite information table 22 relative to the care-recipient specified instep S601 (step S605). Then, the control unit 11, based on the readout keywords and the keywords used for searching, determines a recommendation degree of each of the programs searched. Subsequently, the control unit 11 stores the individual information management table 24 with pieces of information containing the determined recommendation degrees, the information on the searched programs and the hit keywords as an item of recommended program information on the care-recipient specified in step S601 (step S606).

Next, the control unit 11 judges whether or not there are left the unprocessed care-for-others information tables 23 related to the users other than the log-in user (step S607). If there are left the unprocessed care-for-others tables 23 (step S607; YES), the control unit executes again the processes from step S601 with respect to the next care-for-others information table 23.

Then, the control unit 11, when completing the processes for the care-for-others information tables 23 with respect to all the users excluding the log-in user (step s607; NO), transmits to the processing target operation terminal the information created based on all pieces of recommended program information stored in the individual information management table 24, thereby displaying on the processing target operation terminal a recommended program page defined as a Web page on which pieces of information on the programs recommended to the care-recipient are displayed in sequence of the recommendation degrees together with the hit keywords in the favorite information table 22 for every care-recipient (step S608). In other words, in the process in step S608, there is displayed, on the processing target terminal, the recommended program page on which the log-in user is able to recognize, for every recipient, the programs (searched by the keywords contained in the care-for-other information) that should be recommended to the care-recipient, and it is feasible to comprehend which part of the program is preferable to the care-recipient (wherein the keyword is comprehensible) with respect to the program (containing the keyword with the confidential flag set OFF in the favorite information table 22 of the care-recipient) among those recommended programs, to which the care-recipient shows his or her taste.

Thereafter, the control unit 11 executes processes corresponding to the contents of the operations on the recommended program page of the log-in user, such as a process of storing the individual information management table 24 of other user with the information as a piece of notification inputted with the same other user specified (step S609). Then, when indicated to finish, the control unit 11 finishes step S609 and the recommended program information displaying process.

As discussed above in depth, according to the information browse supporting system 10, each user is able to easily search for the BS digital broadcasting program suited to the user's own taste, and search for the E-mail and the Web page important to the user himself or herself among Web pages opened to the public on the Internet 100 and self-addressed E-mails (such as E-mails for advertisements) in a way that enables the user to recognize how much other users show the helpful care for the user himself or herself. Further, the information browse supporting system 10 is capable of notifying the caretaker of the program preferable enough to be recommended to the care-recipient for watching the program together with the information (the keyword) showing which part of the program is preferable to the care-recipient. Moreover, each user can set confidential the keyword that the user desires to conceal from others, and therefore no problem of privacy arises.

Accordingly, the user browses the information presented to the user himself or herself through the present information browse supporting system 10, and is thereby able to recognize how other user has a concern about the user himself or herself and in turn show a kind care to other user. As a result, the group consisting of the users of the information browse supporting system 10 becomes a group of members (e.g., family members) who are bright and have talks full of topics.

Modified Example

The information browse supporting system 10 according to the embodiment discussed above can be modified in a variety of forms. For instance, the information browse supporting system 10 in the embodiment is the system implementing the function as the BS digital tuner and may also be configured as a system (a so-called home server) used in connection with the BS digital tuner.

Further, the information browse supporting system 10 may be configured in a way that does not include the BS digital tuner at all, and may also be configured to have only a function of receiving the service information and displaying the program guide based on the service information with respect to the BS digital broadcasting program.

Further, the information browse supporting system 10 is configured based on the assumption of being used in the individual house bur may be modified to execute the processes for each of a plurality of groups, and, if the unnecessary functions (such as the program recording function etc.) are removed, it follows that a server capable of providing the services described above to the members of the plurality of groups.

Still further, the receiving tray page provided by the information browse supporting system 10 is structured the same as what is provided by a typical Web mail server (what is structured to neither execute the process of changing the display mode corresponding to the recommendation degree nor indicate the recommending user), the E-mail important to the user (that should be read by the user) can be easily found out by changing an E-mail importance (represented by a value of X-Priority etc. of a mail header) according to the recommendation degree.

What is claimed is:

1. An information browse method comprising:
   setting a first search condition, input by any one of a plurality of first users, for searching for information suited to this first user, as first search condition information on this first user;
   setting a second search condition, input by any one of a plurality of second users in a way that specifies a first user from among the first users, for searching information suited to this first user, as second search condition information input by the second user on this first user;
   searching, from within browsing target information containing a plurality of information elements, for an information element with respect to a certain first user in accordance with the first search condition information on the certain first user and searching, from within the browsing target information, for an information element with respect to the certain first user in accordance with the second search condition information on the certain first user; and presenting to the certain first user a piece of information corresponding to a searched result from the first search condition input by the first user and a piece of information corresponding to a searched result from the second search condition input by the second user.

2. The information browse method according to claim 1, wherein said second search condition information contains setting user information indicating the second user who set the second search condition, and said presenting presents to the certain first user the setting user information of the second user to the respective information elements searched based on the second search condition information.

3. The information browse method according to claim 1, further comprising:

searching, based on the second search condition information set by a certain second user with respect to a first user, for an information element suited to this first user from the browsing target information, and checking whether the searched information element is searched by the first search condition information set of the first user; and presenting to the certain second user a piece of information corresponding to a searched result and a checked result.

4. The information browse method according to claim 3, wherein the first search condition information contains one or more pieces of information including a keyword and a confidential flag for indicating whether a permission of using this keyword is given to the second user, and said searching by the certain second user involves performing the check about the searched information element by use of only the keyword having such a relationship that the confidential flag contained in the first search condition information set by the second user indicates the permission of the first user.

5. The information browse method according to claim 3, further comprising determining a recommendation degree corresponding to a hit keyword count with respect to each of the searched information elements searched using the first search condition and the second search condition.

6. The information browse method according to claim 5, wherein the recommendation degree is derived using data from a care-for-others information table and/or a favorite information table.

7. The information browse method according to claim 6, wherein a program having a larger hit keyword count in the care-for-others information table takes a larger recommendation degree value.

8. The information browse method according to claim 7, wherein information displayed in a program guide are sorted in a format corresponding to the recommendation degree of each item.

9. The information browse method according to claim 6, wherein said determining of the recommendation degree comprising:

receiving electronic mail communications addressed to a logged-in user;

reading keywords entered into the favorite information table related to the logged-in user, and further reading keywords entered into the care-for-others information table related to the logged-in user;

searching the electronic mail communications for the keywords set in the favorite information table and in the care-for-others information table; and computing the recommendation degree of each electronic mail communications communication, where the electronic mail communications are displayed according to a format corresponding to the recommendation degree for each electronic mail communication.

10. The information browse method according to claim 1, wherein said setting of the second search condition involves generating the second search condition information by analyzing natural language information input in such a way that any one of the plurality of second users specifies a first user from among the first users.

11. An information browse method comprising:

making a server to set information input by a first user as a first search condition corresponding to a first user;

making said server to set information by a second user as a second search condition corresponding to the first user;

receiving from said server a result of searching based on the first search condition and another result of searching based on the second search condition.

12. The information browse method according to claim 11, wherein said setting of the second search condition contains setting user information indicating the second user who set the second search condition, and said receiving of results of searching involves presenting to the certain first user the setting user information of the second user to the respective information elements searched based on the second search condition.

13. The information browse method according to claim 11, further comprising:

searching, based on the second search condition set by a certain second user with respect to a first user, for an information element suited to this first user from the browsing target information, and checking whether the searched information element is searched by the first search condition set in of the first user; and presenting to the certain second user a piece of information corresponding to a searched result and a checked result.

14. The information browse method according to claim 13, wherein the first search condition information contains one or more pieces of information including a keyword and a confidential flag for indicating whether a permission of using this keyword is given to the second user, and said searching by the certain second user involves performing the check about the searched information element by use of only the keyword having such a relationship that the confidential flag contained in the first search condition set by the second user indicates the permission of the first user.

15. The information browse method according to claim 11, wherein said setting of the second search condition involves generating the second search condition by analyzing natural language information input in such a way that any one of the plurality of second users specifies a first user from among the first users.

16. An information browse system comprising:

a first search condition information storing unit of storing information, input by any one of a plurality of first users, for searching for information suited to this first user, as first search condition information on this first user;

a second search condition information storing unit of storing information, input by any one of a plurality of second users in a way that specifies a first user from among the first users, for searching information suited to this first user, as second search condition information input by the second user on this first user;

an information searching unit for searching, from within browsing target information containing a plurality of information elements, for an information element with respect to a certain first user in accordance with the first search condition information on the certain first user stored in said first search condition information storing unit and for searching, from within the browsing target information, for an information element with respect to the certain first user in accordance with the second search condition information on the certain first user stored in said second search condition information storing unit; and an information-presenting unit of presenting to the certain first user a piece of information corresponding to a searched result in accordance with the first search condition input by the first user and a piece of information corresponding to a searched result from the second search condition input by the second user, by said information-searching unit.

* * * * *

UNITED STATES PATENT AND TRADEMARK OFFICE
CERTIFICATE OF CORRECTION

PATENT NO. : 7,860,945 B2
APPLICATION NO. : 09/964637
DATED : December 28, 2010
INVENTOR(S) : Tsuneyuki Tsuji et al.

It is certified that error appears in the above-identified patent and that said Letters Patent is hereby corrected as shown below:

Column 18, Line 2, in Claim 9, after "mail" delete "communications".

Column 18, Line 35 (Approx.), in Claim 13, after "set" delete "in".

Column 18, line 39 (Approx.), in Claim 14, after "condition" delete "information".

Signed and Sealed this
Fifth Day of July, 2011

David J. Kappos
*Director of the United States Patent and Trademark Office*